(12) United States Patent
Ture

(10) Patent No.: US 7,098,249 B2
(45) Date of Patent: Aug. 29, 2006

(54) HIGHLY STABILIZED COLLOIDAL SYSTEM FOR IMPROVING THE PHYSICAL, MECHANICAL AND CHEMICAL PROPERTIES OF BUILDING MATERIALS

(75) Inventor: Angelo Ture, Leporano (IT)

(73) Assignee: Refrasud S.R.L., Taranto (IT)

( * ) Notice: Subject to any disclaimer, the term of this patent is extended or adjusted under 35 U.S.C. 154(b) by 171 days.

(21) Appl. No.: 10/481,118

(22) PCT Filed: Mar. 18, 2003

(86) PCT No.: PCT/IB03/01038

§ 371 (c)(1),
(2), (4) Date: Jan. 21, 2004

(87) PCT Pub. No.: WO03/093189

PCT Pub. Date: Nov. 13, 2003

(65) Prior Publication Data

US 2005/0165119 A1    Jul. 28, 2005

(30) Foreign Application Priority Data

Apr. 30, 2002   (IT) .......................... BA2002A0017

(51) Int. Cl.
*B01F 3/12* (2006.01)
*C04B 26/00* (2006.01)
*B01F 17/00* (2006.01)

(52) U.S. Cl. .......................... 516/32; 516/33; 106/822; 252/363.5

(58) Field of Classification Search .................. 516/32
See application file for complete search history.

(56) References Cited

U.S. PATENT DOCUMENTS 4,276,054 A * 6/1981 Schmolka et al. ............. 44/281
6,783,746 B1 * 8/2004 Zhang et al. ............. 423/447.1

* cited by examiner

*Primary Examiner*—Randy Gulakowski
*Assistant Examiner*—Timothy J. Kugel
(74) *Attorney, Agent, or Firm*—Andrew Wilford

(57) ABSTRACT

A highly stabilized colloidal system is disclosed comprising (a) 30 to 45 volume percent of a liquid phase comprising C15–C20 saturated hydrocarbons, C18–C25 unsaturated hydrocarbons and paraffinic mineral oil; and (b) 55 to 70 volume percent of a solid phase comprising a carbon fraction, a thickener, calcium carbonate and alumina. The highly stabilized colloidal system is used for improving the physical, mechanical, and chemical properties of building materials.

10 Claims, 6 Drawing Sheets

HIGHLY STABILIZED COLLOIDAL SYSTEM FOR IMPROVING THE PHYSICAL, MECHANICAL AND CHEMICAL PROPERTIES OF BUILDING MATERIALS

CROSS REFERENCE TO RELATED APPLICATIONS

This application is the U.S. National Phase of PCT/IB03/01038 filed 18 Mar. 2003 and claiming the benefit of the priority of Italian Application BA 2002 A000017 filed 30 Apr. 2002.

FIELD OF THE INVENTION

The present invention relates to a new colloidal system which can improve the physical, mechanical and chemical properties of basic and/or neutral products, in particular, premixed building materials based on silicon, calcium carbonate, plaster, containing hydraulic and aerial binders; refractory materials based on alumina, magnesite, chromite, zirconium, etc.; varnishes stuccos, plasters, plastic materials polymers, and the like.

OBJECT OF THE INVENTION

It is the object of the invention to improve the physical, mechanical and chemical properties of materials, including thermal isolation, UV-rays resistance, corrosion resistance and mechanical resistance, elasticity, scratch resistance, fixing to the supporting base, and the reduction of thermal expansion.

SUMMARY OF THE INVENTION

These advantages can be realized by this innovative colloidal system highly stabilized which, mixed with inerts, various binders, plastic materials, natural and synthetic rubber, liquid polymers, improves the physical, mechanical and chemical properties of materials. This system is characterized by a liquid phase (from 30 to 45% in volume) comprising saturated hydrocarbons C15–C20, unsaturated hydrocarbons C18–C25, paraffinic mineral oil, and by a solid phase (from 55 to 70% in volume) comprising a Carbon fraction, a thickener/coagulator, Calcium carbonate alumina and other salts.

These and other advantages will be shown in the detailed description of the invention which provides some practical examples, descriptive but not restrictive of the application of the new composition.

The new compositions comprise a liquid phase and a solid phase. The liquid phase, whose percentage in volume ranges between 30 and 45%, comprises a fraction of saturated hydrocarbons (C15–C20) between 60% and 80%, (molecular structures with very high activation energy) which diffused in paraffinic oils give chemical stability and density and viscosity to the product; a fraction of unsaturated hydrocarbons (C18–C25) between 10% and 30%, which are more reactive and promote oxidation; their reactivity is useful to dry thin layers; a fraction of mineral oil (both paraffinic and siliconic oil) in a percentage of 10% and 30% which make the mixture apt to a plastic application. The solid phase whose percentage in volume ranges between 55 and 70%, comprises a carbon fraction between 60% and 85%, deriving from hydrocarbons combustion residuals, a thickener from 8% to 20%, which works as a homogenizer, to confer a sort of superficial polymerization to the product. Optionally, there can be also metal oxides salts which are amalgamated/blended into the emulsion up to 10%.

Thanks to its chemical and physical properties this innovative system can be applied as a binder or a release agent in the working of plastic materials. The chemical-physical process differs according to the type of basic material to which it is added. In all cases, however, it starts homogenization and cohesion processes which turn the structure into microstructures with microporosity. It is a process of maturation in the case of concrete of any type (refractory and concrete for civil use), plasters, limes, chalk; it is a polymerization process in the case of varnishes, resins, bitumen, rubber, etc.; it is a ceramization process in the case of bricks and ceramic products in general.

The new system can be used as it is (creamy), that is, added with the mentioned products in a percentage ranging between 0.01% and 3–4%; or it can be used as liquid or powder, that is added with other products (for examples based on silicon, alumina, magnesite, calcium oxide or zirconium) in a percentage ranging between 1% and 20%. The additive is used in indirect form, that is mixed with other compounds, and is added with other products in a percentage ranging up to 20%.

The advantages coming from the use of the invention comprise a remarkable improvement of the physical, mechanical and chemical properties of materials, like thermal isolation, and mechanical resistance, fixing properties, higher elasticity, lower expansions; and other physical properties like waterproofing, UV-rays resistance, corrosion resistance, color fastness.

Laboratory tests were carried out to prove what it has been said. In particular:

UV-rays resistance test: the calcareous and siliceous specimen smeared with the emulsion invented, were subject to UV-rays for 720 hours, without degrading the surface. On the contrary the surface appears vetrified.

Figure 1:
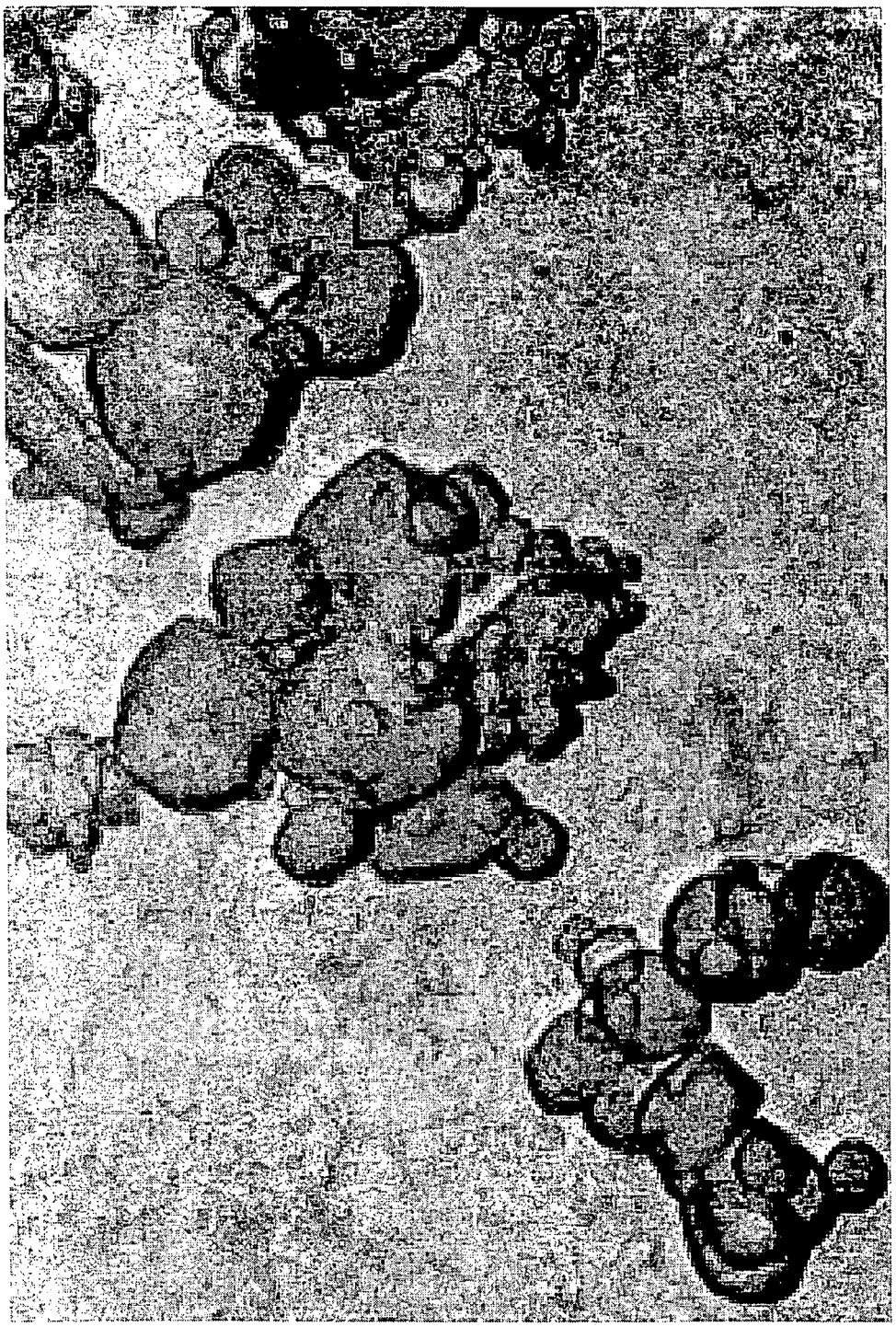
FIG. 1 is a photomicrograph showing the UV-rays resistance test: the calcareous and siliceous specimen smeared with the present emulsion, were subjected to UV-rays for 720 hours, without degrading the surface. On the contrary the surface appears vitrified.
Figure 2:
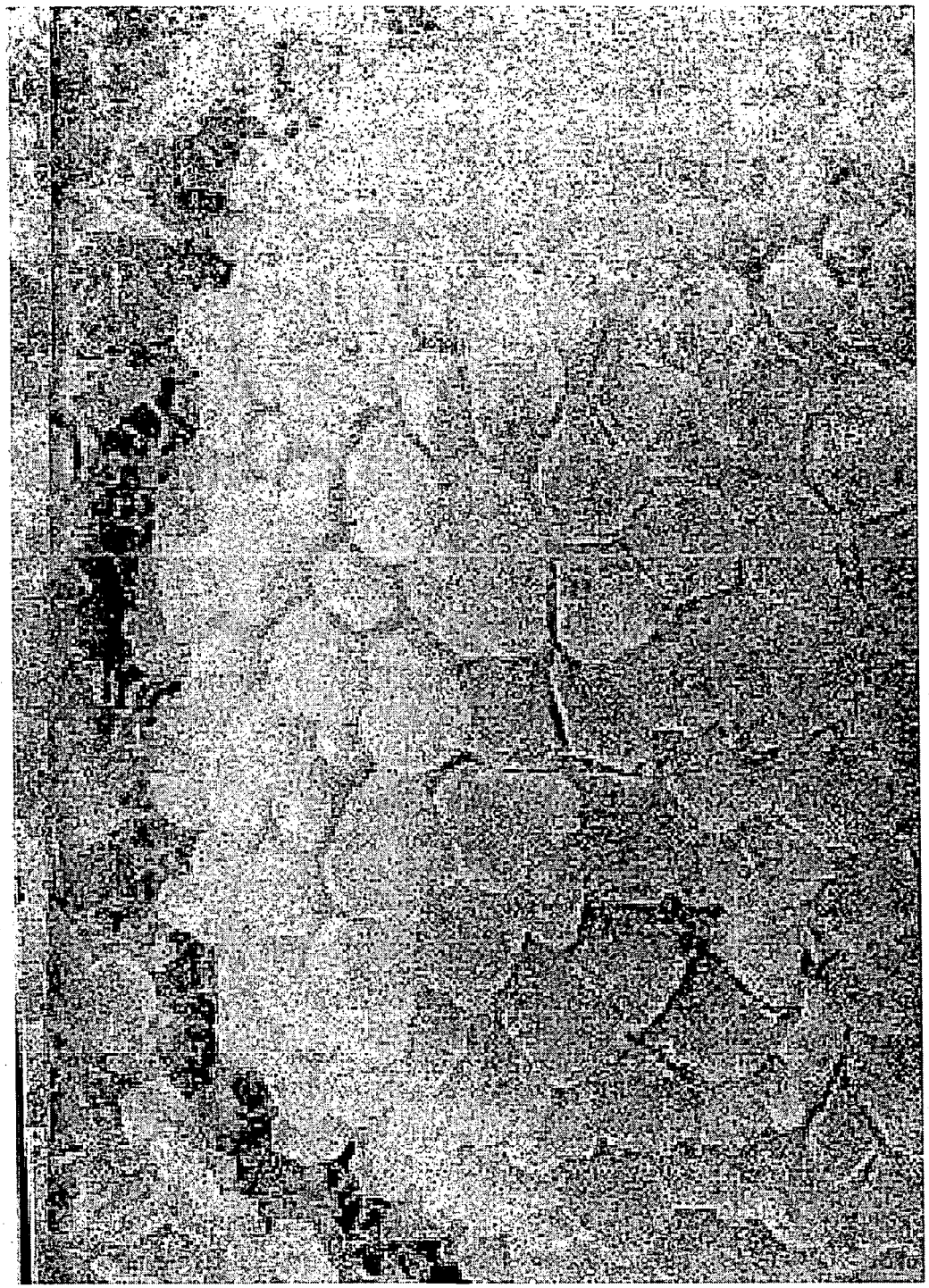
FIG. 2 is a photomicrograph showing the mechanical resistance test: SEM observation of the surfaces of the specimen has shown the inclusion of intercrystal cracks and the loss of continuity of the structure compared to the non-additivated specimen.

Mechanical resistance test: the same specimens showed an increase of the breaking load higher than 15% after 12 is hours. Furthermore, SEN observation of the surfaces has shown the inclusion of intercrystal cracks (FIG. 2) and the loss of continuity of the structure compared to the non-additivated specimen;

Corrosion resistance test: the sample kept in salt mist and saturated humidity atmosphere did not suffer from structural change.

Figure 3:
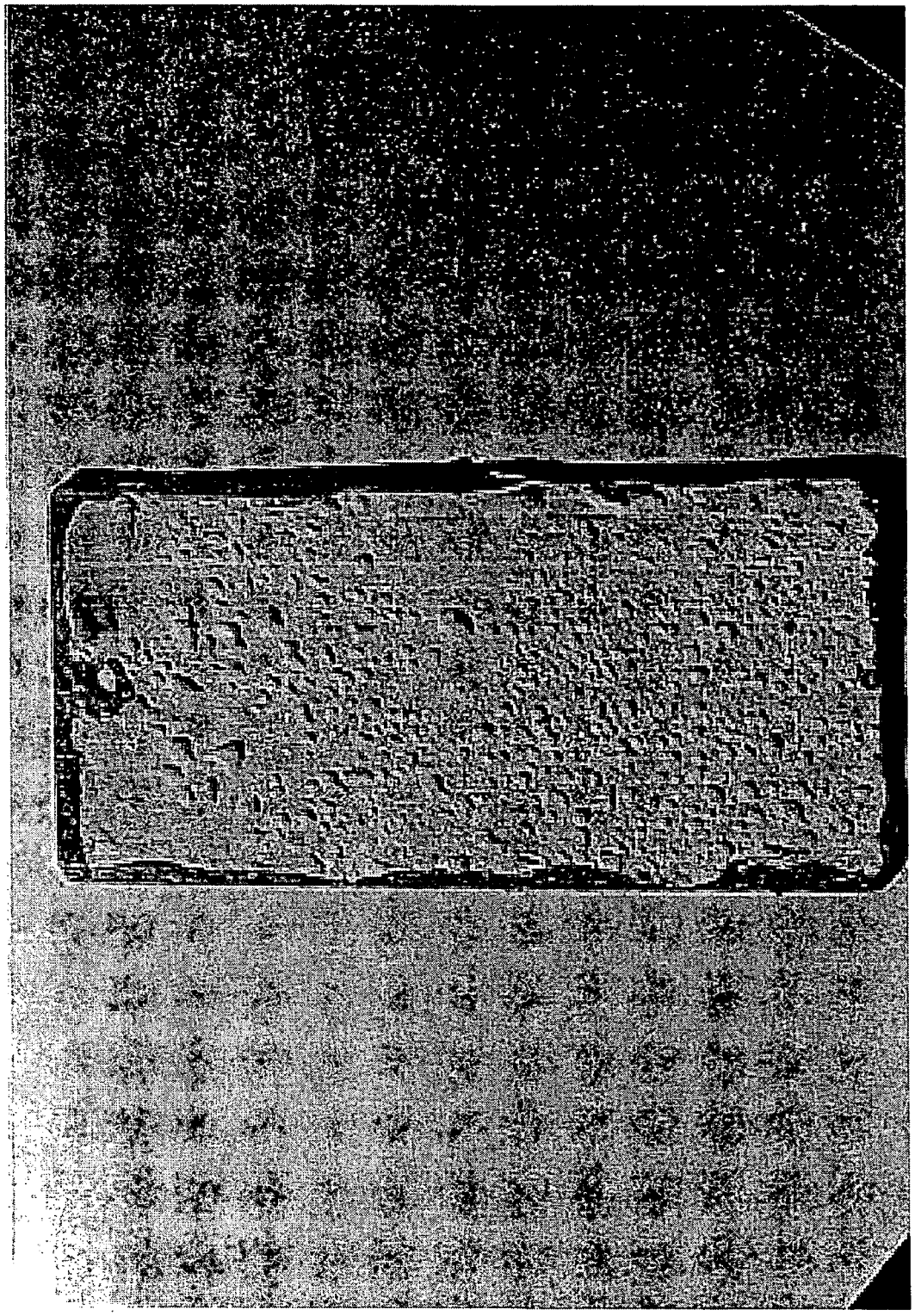
FIGS. 3 and 4 refer to photomicrographs of two samples of an elastomeric sheath treated with the present colloidal system after 1000 hour exposure to salt mist.
Figure 4:
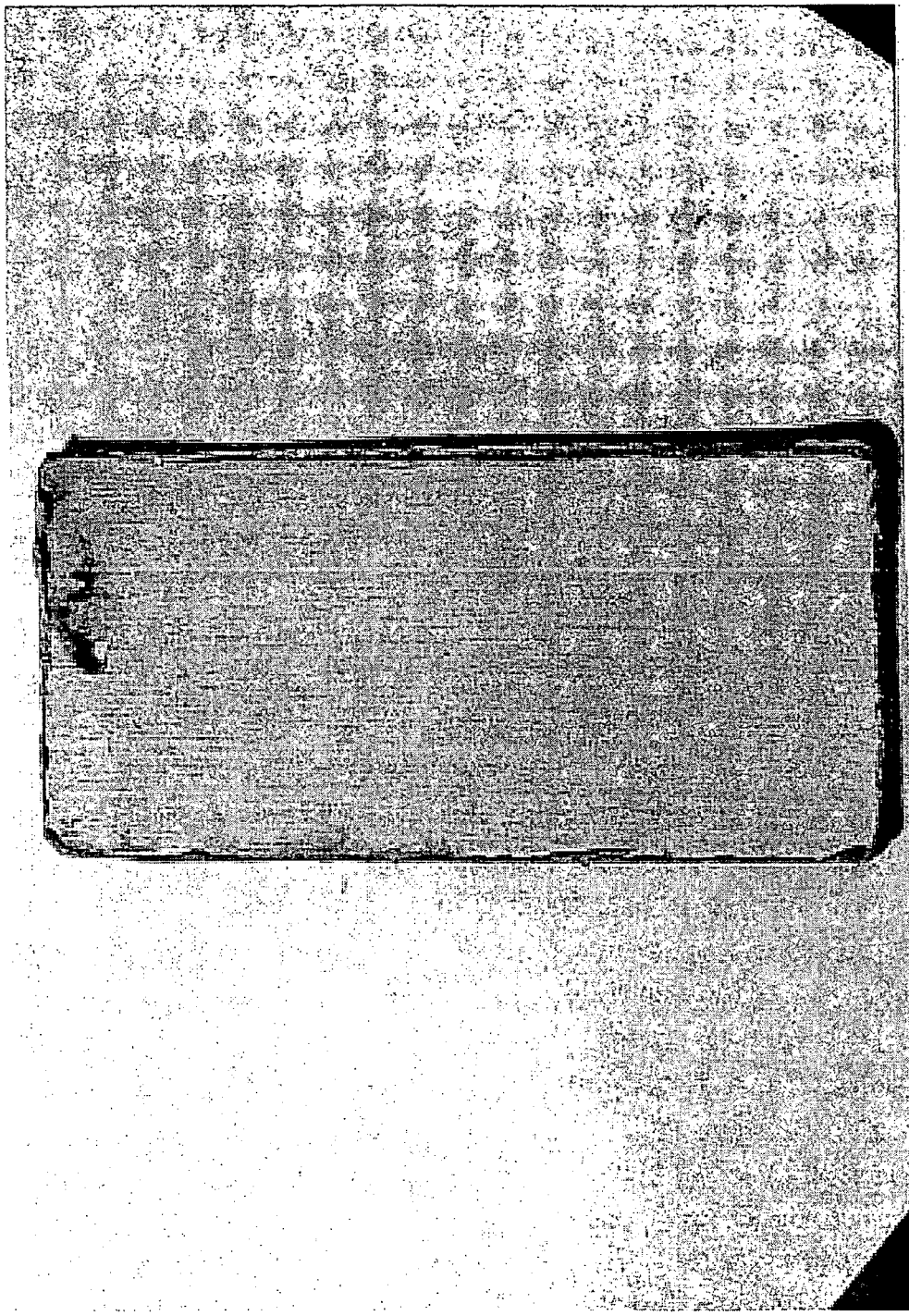

As an example the results of the tests carried out in accredited laboratories. In particular, the output of FIGS. 3 and 4 refer to an elastomeric sheath treated with the present colloidal system after 1000 hour exposure to salt mist. The colloidal system added to a standard dry premixed cement plaster, produced a remarkable improvement of the penetration resistance, to flexion and compression resistance, cloride ion and sulfate ion penetrability, water absorption by capillarity, as reported in Table 1.

carbons C18–C25 (25%), paraffinic mineral oil (10%). The solid phase comprises a carbon fraction (73%) a thickener (7%) and calcium carbonate (13%) and alumina (7%).

Sample 6a: comprises a liquid phase (15.5%) and a solid phase (84.5%) well emulsified. The liquid phase comprises saturated hydrocarbons C15–C20 (75%), unsaturated hydrocarbons C18–C25 (10%), paraffinic mineral oil (15%). The solid phase comprises a carbon fraction (70%) a thickener (10%) and calcium carbonate (10%) and alumina (10%).

| Laboratory Test | Additivated plaster | Known cement plastering |
| --- | --- | --- |
| Mixing water | 23% | 23% |
| Consistency test [UNI 7044] | 84.5 | 84.0 |
| Penetration resistance after 24 h [UNI 7927] | 598.1 N/cm$^2$ | 174.8 N/cm$^2$ |
| Resistance to bending stress [UNI EN 196-11] | 1.31 N/mm$^2$ | 0.88 N/mm$^2$ |
| Resistance to compression stress [UNI EN 196-11] | 3.06 N/mm$^2$ | 1.70 N/mm$^2$ |
| Chloride ion penetration at 36 h [UNI 7228] | 6.9 cm | 13.1 cm |
| Sulphate ion penetration at 36 h [UNI 8019] | 6.0 cm | 13.02 cm |
| Capillarity water absorption [UNI 9526] | Capillary height: 155 mm Water absorption: 3.46 g/cm$^2$ | Capillary height: >173 mm Water absorption: 4.05 g/cm$^2$ |

The colloidal system added to a standard cement produces a fluidifying effect which is higher than the effect for a non-added cement, but lower than the effect of a cement added with a commercial superfluidifier. The compression resistance test shows that the cement mixed with the invented colloidal system presents low values at the beginning and high values after. In other words, the cement maturation with the colloidal system is lower (which allows longer times of workability) but the values reached in time are higher than those of other compositions.

The additivated cement gives a higher resistance to cloride ion and sulfate ion penetration and, keeping the cement pH constant, increases its durability.

Figure 5:
FIGS. 5 and 6 are photomicrographs that show the homogenization and cohesion process which transforms the refractory cement into a microstructure with microporosity. Non-additivated cement, in fact, has a more irregular surface (FIG. 5) compared with the additivated sample which appears much more compact (FIG. 6).
Figure 6:

FIGS. 5 and 6 show the homogenization and cohesion process which transforms the refractory cement into a microstructure with microporosity. Non-additivated cement, in .fact, has a more irregular surface (FIG. 5) compared with the additivated sample which appears much more compact (FIG. 6).

EXAMPLE

According to some examples the qualitative and quantitative analysis are reported:

Sample 2a: comprises a liquid phase (45%) and a solid phase (55%) well emulsified. The liquid phase comprises saturated hydrocarbons C15–C20 (50%), unsaturated hydrocarbons C18–C25 (50%), paraffinic mineral oil (20%). The solid phase comprises a carbon fraction (83%) a thickener (8%) and calcium carbonate (9%).

Sample 3a: comprises a liquid phase (35.5%) and a solid phase (64.5%) well emulsified. The liquid phase comprises saturated hydrocarbons C15–C20 (40%), unsaturated hydrocarbons C18–C25 (30%), paraffinic mineral oil (30%). The solid phase comprises a carbon fraction (78.5%) a thickener (12.5%) and calcium carbonate (9%).

Sample 4a: comprises a liquid phase (21.5%) and a solid phase (78.5%) well emulsified. The liquid phase comprises saturated hydrocarbons C15–C20 (65%), unsaturated hydro-

What is claimed is:

1. A highly stabilized colloidal system comprising
   (a) 30 to 45 volume percent of a liquid phase comprising C15–C20 saturated hydrocarbons, C18–C25 unsaturated hydrocarbons and paraffinic mineral oil; and
   (b) 55 to 70 volume percent of a solid phase comprising a carbon fraction, a thickener, calcium carbonate and alumina.

2. The highly stabilized colloidal system according to claim 1 mixed with another product selected from the group consisting of alumina, magnesite, calcium oxide and zirconium said product present in the mixture in percentages from 1% to 20%.

3. The highly stabilized colloidal system according to claim 2 as a powder or liquid.

4. The highly stabilized colloidal system according to claim 1 capable of being added to a product selected from the group consisting of concrete, plasters, limes, chalk, varnishes, resins, bitumen, rubber, bricks and ceramic products.

5. The highly stabilized colloidal system according to claim 4 capable of giving the products mentioned a high thermal isolation, higher UV-ray resistance, increased corrosion resistance, increased mechanical resistance, higher elasticity, increased scratch resistance, better fixing to a supporting base and an increased reduction of thermal expansion.

6. The highly stabilized colloidal system according to claim 1 wherein the C15–C20 saturated hydrocarbons comprise from 60% to 80% of the liquid phase and the C18–C25 unsaturated hydrocarbons comprise from 10% to 30% of the liquid phase.

7. The highly stabilized colloidal system according to claim 1 wherein the mineral oil is present in the liquid phase in an amount of 60% to 80% based on the amount of the solid phase.

8. The highly stabilized colloidal system according to claim 1 wherein the carbon fraction is present in the solid phase in an amount of 10% to 30% based on the amount of the liquid phase.

9. The highly stabilized colloidal system according to claim 1 wherein the thickener is 8% to 20% of the solid phase.

10. The highly stabilized colloidal system according to claim 1 capable of transforming the structure of a material to which it is added into a microstructure with microporosity through a physical-chemical homogenization and cohesion process.

* * * * *